No. 853,040.  
PATENTED MAY 7, 1907.  
H. C. TABER.  
PIPE HANGER.  
APPLICATION FILED DEC. 20, 1906.  
2 SHEETS—SHEET 1.
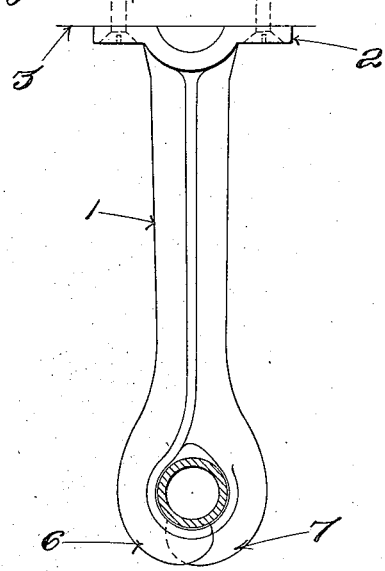
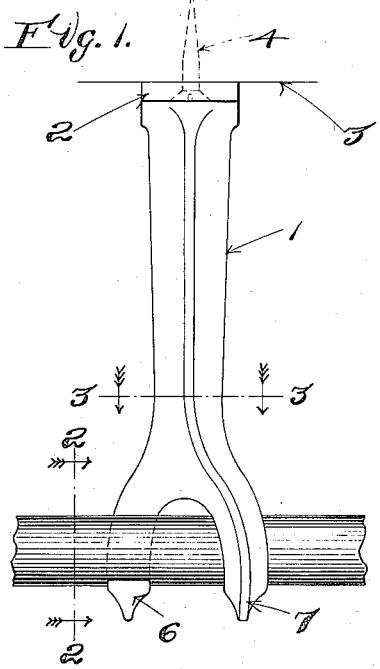
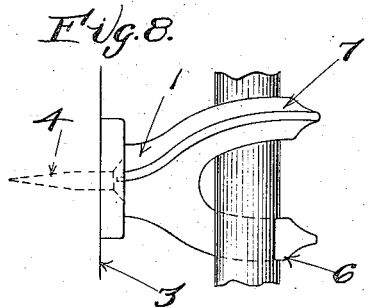
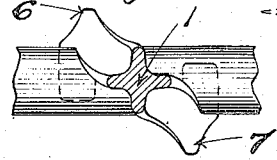
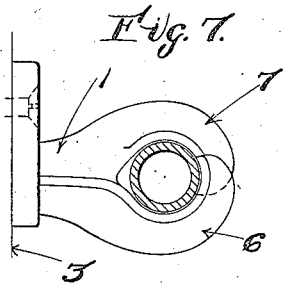
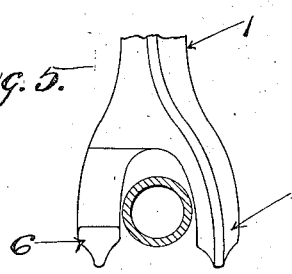
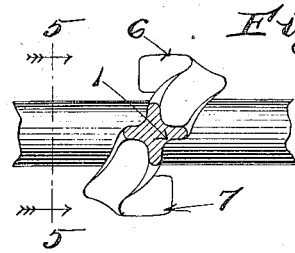
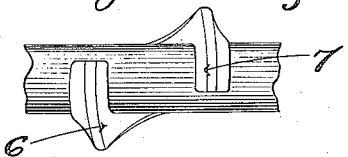
Witnesses:  
John H. Parker  
Josephine E. Long  
Inventor:  
Henry C. Taber  
by Macleod, Calver, Copeland & Dike  
Attorneys.

No. 853,040. PATENTED MAY 7, 1907.
H. C. TABER.
PIPE HANGER.
APPLICATION FILED DEC. 20, 1906.

2 SHEETS—SHEET 2.

Witnesses:
John H. Parker
Josephine E. Long

Inventor.
Henry C. Taber
by Macleod, Calver, Copeland & Dike
Attorneys.

UNITED STATES PATENT OFFICE.

HENRY C. TABER, OF WARE, MASSACHUSETTS.

PIPE-HANGER.

No. 853,040.　　　　Specification of Letters Patent.　　　Patented May 7, 1907.

Application filed December 20, 1906. Serial No. 348,791.

*To all whom it may concern:*

Be it known that I, HENRY C. TABER, a citizen of the United States, residing at Ware, county of Hampshire, State of Massachusetts, have invented a certain new and useful Improvement in Pipe-Hangers, of which the following is a specification, reference being had therein to the accompanying drawings.

My invention has for its object to provide an improved hanger for supporting pipes, particularly overhead pipes in buildings and it consists of a bracket provided with a base or other portion by means of which it may be affixed to the wall or other contiguous part of the building or object on or in which the pipes are to be supported; a shank portion the length of which governs the distance at which the pipe is to be supported from the wall, ceiling or the like and holders or fingers which project from the shank portion at the free end thereof, and which encircle or partially encircle the pipe to hold the latter securely in place, the said holders being so located with reference to each other that when the hanger is turned with reference to the pipe the pipe may be slipped out from between the curved holders so as to disengage the pipe from the hanger.

My invention will be clearly understood from the following description taken in connection with the accompanying drawings which form a part thereof and the novel features of the invention are pointed out and clearly defined in the claims at the close of this specification.

Figure 10:
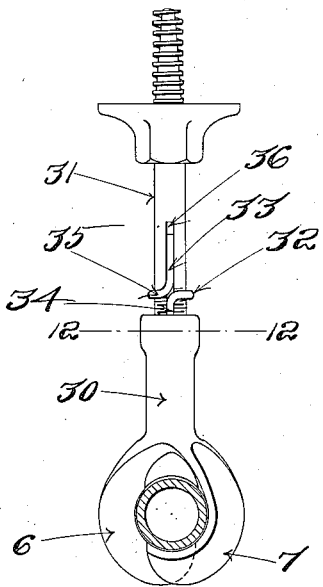
Figure 9:
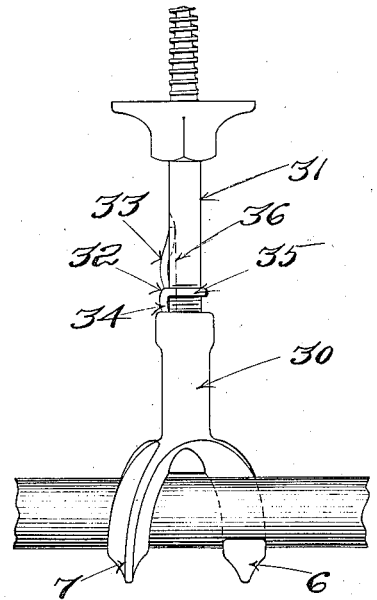
Figure 11:
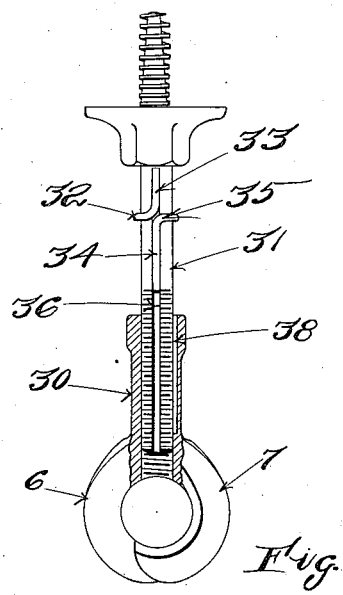
Figure 12:
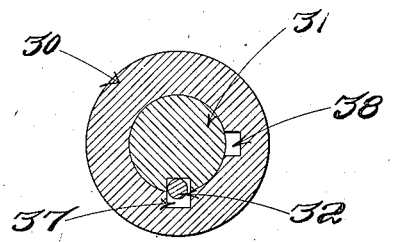

In the drawings, Figure 1 represents a front view of my improved hanger with a section of pipe shown as placed therein. Fig. 2 is a vertical section on line 2—2 of Fig. 1, showing the pipe in section and a side view of the hanger. Fig. 3 is a view looking down from the line 3—3 of Fig. 1. Fig. 4 is a similar view to that shown Fig. 3 but shows the hanger turned through one-quarter of a revolution with reference to the line of pipe so as to permit the pipe to be removed therefrom. Fig. 5 is a cross section on line 5—5 of Fig. 4, looking toward the right of the line 5—5, and showing the lower part of the hanger in the position in which it may be disengaged from the pipe. Fig. 6 is a bottom view of my hanger with a section of pipe in engagement therewith. Figs. 7 and 8 are modifications of my hanger which will be hereinafter more fully described. Fig. 9 is a front view of a modified form of hanger embodying my invention, said hanger being provided with an adjustable shank so that the shank may be lengthened or shortened, and being also provided with means for locking the shank in any desired position. Fig. 10 is a side view of the hanger shown Fig. 9, the pipe in engagement therewith being shown in section. Fig. 11 is a detail designed to show more clearly the construction of the adjustable shank. Fig. 12 is a section on line 12—12 of Fig. 10.

Referring to the drawings,—1 represents the shank of the hanger, and 2 the base which is provided with screw holes or other suitable means whereby the hanger may be secured to the ceiling or other support. As shown in the drawings 3 represents the line of the ceiling or wall, and the hanger is represented as secured thereto by screws 4 passing through screw holes in the base 2.

The other end of the shank is provided with curved pipe supporting fingers 6, 7 which branch from opposite sides of the shank and are oppositely curved outwardly, downwardly and then inwardly so as to partially encircle the pipe, being curved or otherwise bent to conform to the shape of the pipe, said fingers being also in different planes from each other, so the pipe may pass between them and the inwardly turned ends may lap past each other when viewed from the direction shown in Fig. 2. The fingers are spread sufficiently apart viewed as in Figs. 1 and 5, to permit the pipe being passed in and out between the fingers; that is, they should be spread apart laterally about equal to the diameter of the pipe. It is preferable to make the spread just equal to the diameter of the pipe, but if desired to afford a little more freedom of movement they may be made with a greater spread than the diameter of the pipe.

By the use of hangers of the construction described a system of piping may very easily and expeditiously be installed, and when in position the pipe is held securely and may be readily removed without uncoupling the sections. To insert or remove the pipe it is not necessary to slide the pipe endwise at all. In installing it the pipe will be moved up between the fingers 6, 7 as shown in Fig. 5, then by giving the hanger a quarter turn, it will bring the curved arms around in supporting position, as shown in Figs. 1, 2 and 8, in which position the hanger will then be secured to the ceiling or other support.

When it is desired to remove the pipe, the hanger will be unscrewed from the wall and given a quarter turn in the position shown Figs. 4 and 5, when the pipe may readily be withdrawn without endwise movement of the pipe or the hanger itself may be lifted away from the pipe.

My improved hanger is especially intended for use in supporting the piping of overhead sprinkler systems, such as are installed in shops, factories and other buildings, as a protection against fire, but it is obvious that it is applicable for supporting piping for other purposes.

In Figs. 7 and 8 the invention is shown as applied to a wall support, the shank in this instance being made shorter than in Figs. 1 and 2, but is otherwise constructed substantially as shown in Figs. 1 to 6 inclusive.

In Figs. 9 to 12 I have shown a modified form of hanger embodying my invention. This form is characterized chiefly by the adjustability of the shank portion, the free end 30 of the hanger, that is the portion upon which is secured the curved holders, is provided with a threaded opening lengthwise thereof, see Fig. 11, into which the threaded stem or shank 31 is screwed. For the purpose of locking these two parts so that they cannot be rotated relatively to each other I provide a spring clip or locking key 32 of the shape shown. This clip comprises a coil portion 35 which encircles the shank 31 and two end portions 33, 34, which extend lengthwise of the shank. The parts 33 and 34 lie in a slot which is in effect a key-slot 36, in the said shank 31, and the portion of the part 34 which projects out of the said slot is received in a slot 37 on the inner face of the sleeve or body portion 30. In this way a slidable spline or key is provided. By slipping back this spline or key so that its lower end is clear of the portion 30, the parts 30 and 31 may be turned relatively to each other thereby lengthening or shortening the shank of the hanger, as will be clear. By this arrangement it will also be clear that the base of the hanger need not be disturbed or moved in disengaging the pipe therefrom, it being only necessary to slip back the spline or key on the shank 31, turn the part 30 which carries the curved holders through a quarter of a revolution and the pipe may then be disengaged.

Preferably the shank member 30 is provided with two key slots 37 and 38, ninety degrees apart so that the two shank members may be locked together in either of the two positions.

Preferably the shank member 30 is provided with two key locking slots 37 and 38 ninety degrees apart so that after the shank member 31 has been screwed in far enough to bring the flange of the screw in contact with the ceiling, only a slight additional turn will be required to bring it into position for the two shank members to be locked together. If there were but one key slot, it might be necessary in some instances in screwing the shank to the ceiling to force the screw to one of two points which would bring the slot either to a point directly above the axis of the pipe or to a point in a line at right angles with the axis of the pipe, and in doing so, the screw would be turned three-eighths of a revolution more or less after the flange came in contact with the ceiling, resulting in the wood about the screw being overstrained. With the double slot, the shank screw may be stopped on any quarter and still allow the fingers to assume their proper position in relation to the pipe. The extra force required in this case would be so slight as to be of no importance.

I claim as my invention:

1. A pipe hanger having a shank, one end of which is adapted to be attached to a support, the other end of which is provided with two pipe supporting fingers which extend from the end of said shank in planes which are spaced apart from each other a distance as great as the diameter of the pipe to be held, said fingers being adapted to partially encircle the pipe, the space between the planes in which said fingers lie permitting the rotation of the hanger on its axis a quarter of a revolution, whereby the pipe and hanger may be engaged or disengaged from each other while the axis of the pipe is at right angles with the axis of the hanger and without longitudinal movement of the pipe.

2. A pipe hanger having a shank composed of two members, one of which is formed with a screw thread and the other of which is tapped out to receive said threaded member, whereby the shank may be varied in length, the tapped out member being formed with a grooved key slot and the threaded member being provided with a sliding key adapted to engage with said key slot to lock the two members in adjusted position.

3. A pipe hanger having a shank composed of two members, one of which is formed with a screw thread and the other of which is tapped out to receive said threaded member, whereby the shank may be varied in length, the tapped out member being formed with a key slot and the threaded member being provided with a sliding key which is coiled around said threaded member and has an end portion which extends longitudinally of said threaded member and is adapted to engage with the key slot in said tapped out member.

4. A pipe hanger having a shank composed of two members, one of which is formed with a screw thread and the other of which is tapped out to receive said threaded member, whereby the shank may be varied in length, both the said shank members being formed with longitudinal key slots in the periphery and a sliding key adapted to engage with said slots and lock the two shank members in adjusted position.

5. A pipe hanger having pipe supporting fingers which spread in opposite directions outwardly and are then reversely turned and lapped past each other in planes spaced apart from each other a distance as great as the diameter of the pipe to be held, whereby the pipe and the hanger may be disengaged from each other by turning the hanger on its axis one-fourth of a revolution, said shank being composed of two members, one of which telescopes upon the other, one of said shank members being provided with a sliding key and the other with a key slot whereby the two shank members may be locked in adjusted position.

6. A pipe hanger having pipe supporting fingers which spread in opposite directions outwardly and are then reversely turned and lapped past each other in planes spaced apart from each other a distance as great as the diameter of the pipe to be held, whereby the pipe and the hanger may be disengaged from each other by turning the hanger on its axis one-fourth of a revolution, said shank being composed of two members, one of which is formed with a screw thread and the other of which is tapped out to receive said threaded member whereby the shank may be varied in length, the tapped out member being formed with a grooved key slot and the threaded member being provided with a sliding key adapted to engage with said key slot to lock the two members in adjusted position.

7. A pipe hanger having pipe supporting fingers which spread in opposite directions outwardly and are then reversely turned and lapped past each other in planes spaced apart from each other a distance as great as the diameter of the pipe to be held, whereby the pipe and the hanger may be disengaged from each other by turning the hanger on its axis one-fourth of a revolution, said shank being composed of two members, one of which is formed with a screw thread and the other of which is tapped out to receive said threaded member, whereby the shank may be varied in length, the tapped out member being formed with a key slot and the threaded member being provided with a sliding key which is coiled around said threaded member and has an end portion which extends longitudinally of said threaded member and is adapted to engage with the key slot in said tapped out member.

8. A pipe hanger having pipe supporting fingers which spread in opposite directions outwardly and are then reversely turned and lapped past each other in planes spaced apart from each other a distance as great as the diameter of the pipe to be held, whereby the pipe and the hanger may be disengaged from each other by turning the hanger on its axis one-fourth of a revolution, said shank being composed of two members, one of which is formed with a screw thread and the other of which is tapped out to receive said threaded member whereby the shank may be varied in length, both of said shank members being formed with longitudinal key slots in the periphery and a sliding key adapted to engage with said slots and lock the two shank members in adjusted position.

9. A pipe hanger having pipe supporting fingers which spread in opposite directions outwardly and are then reversely turned and lapped past each other in planes spaced apart from each other a distance as great as the diameter of the pipe to be held, whereby the pipe and the hanger may be disengaged from each other by turning the hanger on its axis one-fourth of a revolution, said shank being composed of two members, one of which is formed with a screw thread and the other of which is tapped out to receive said threaded member whereby the shank may be varied in length, the tapped out member being provided with a plurality of key slots in radially different positions on the periphery and the threaded member being provided with a sliding key adapted to engage with any one of said slots to lock the two shank members in adjusted position at varying relations with each other, both longitudinally and radially.

10. A pipe hanger having a shank composed of two members which telescope upon each other and are radially adjustable with relation to each other, one of said members being provided with a plurality of key slots in radially different positions on the periphery and the other member being provided with a sliding key adapted to engage with any one of said slots to lock the two shank members in adjusted position at varying radial relations with each other.

In testimony whereof I affix my signature, in presence of two witnesses.

HENRY C. TABER.

Witnesses:
 GEORGE M. C. BARNARD,
 REUBEN E. CAPRON.